United States Patent
Lee et al.

(10) Patent No.: US 9,890,257 B2
(45) Date of Patent: Feb. 13, 2018

(54) PROTECTIVE FILM

(71) Applicant: LG CHEM, LTD., Seoul (KR)

(72) Inventors: Hui Je Lee, Daejeon (KR); Hyun Cheol Kim, Daejeon (KR); Yong Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/651,586

(22) PCT Filed: Nov. 21, 2014

(86) PCT No.: PCT/KR2014/011256
§ 371 (c)(1),
(2) Date: Jun. 11, 2015

(87) PCT Pub. No.: WO2015/076612
PCT Pub. Date: May 28, 2015

(65) Prior Publication Data
US 2015/0315346 A1    Nov. 5, 2015

(30) Foreign Application Priority Data

Nov. 21, 2013   (KR) .................. 10-2013-0142080

(51) Int. Cl.
| | | |
|---|---|---|
| C08J 5/18 | (2006.01) | |
| C09J 183/06 | (2006.01) | |
| C09J 183/08 | (2006.01) | |
| C09J 183/04 | (2006.01) | |
| C08G 18/72 | (2006.01) | |
| C09J 175/04 | (2006.01) | |
| C08G 18/75 | (2006.01) | |
| C08G 18/62 | (2006.01) | |
| C08G 18/73 | (2006.01) | |
| C09J 175/00 | (2006.01) | |
| C09J 7/02 | (2006.01) | |
| B32B 27/28 | (2006.01) | |
| C08G 77/20 | (2006.01) | |
| C08G 77/14 | (2006.01) | |
| C08G 77/26 | (2006.01) | |
| C09D 1/00 | (2006.01) | |
| B32B 38/10 | (2006.01) | |

(52) U.S. Cl.
CPC .............. *C08J 5/18* (2013.01); *B32B 27/283* (2013.01); *C08G 18/6229* (2013.01); *C08G 18/722* (2013.01); *C08G 18/73* (2013.01); *C08G 18/755* (2013.01); *C09J 7/0246* (2013.01); *C09J 175/00* (2013.01); *C09J 175/04* (2013.01); *C09J 183/04* (2013.01); *C09J 183/06* (2013.01); *C09J 183/08* (2013.01); *B32B 38/10* (2013.01); *B32B 2250/03* (2013.01); *B32B 2307/202* (2013.01); *B32B 2307/42* (2013.01); *B32B 2457/208* (2013.01); *C08G 77/14* (2013.01); *C08G 77/20* (2013.01); *C08G 77/26* (2013.01); *C08G 2170/40* (2013.01); *C08J 2333/08* (2013.01); *C09D 1/00* (2013.01); *C09J 2201/122* (2013.01); *C09J 2203/318* (2013.01); *C09J 2433/00* (2013.01); *C09J 2483/00* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 2005/0238879 A1* | 10/2005 | Shoshi | ............... | B32B 27/08 428/412 |
| 2012/0231245 A1* | 9/2012 | Kim | ................ | C09J 4/00 428/212 |
| 2013/0030104 A1* | 1/2013 | Sakurai | ............ | C08L 67/02 524/322 |
| 2013/0220533 A1* | 8/2013 | Tonegawa | ......... | C09J 183/04 156/247 |

FOREIGN PATENT DOCUMENTS

| | | |
|---|---|---|
| CN | 100368827 C | 2/2008 |
| CN | 102656243 A | 9/2012 |
| CN | 103097485 A | 5/2013 |
| JP | 01-146977 A | 6/1989 |
| JP | 2001-262088 A | 9/2001 |
| JP | 2002338910 | 11/2002 |
| JP | 2004059860 | 2/2004 |
| JP | 2011063712 | 3/2011 |
| JP | 2012059846 | 3/2012 |
| JP | 2012144705 | 8/2012 |
| JP | 2013-107977 A | 6/2013 |
| JP | 2013216726 | 10/2013 |
| JP | 2013-226676 A | 11/2013 |
| TW | 201217478 A1 | 5/2012 |
| TW | 201323551 A1 | 6/2013 |

(Continued)

OTHER PUBLICATIONS

Shin-Etsu Silicone: Silicone Materials for Resin Modification, available at http://ww.shinetsusilicone-global.com/products/usage/resin_modification/.*

*Primary Examiner* — Alexandre F Ferre
*Assistant Examiner* — Elaine M Vazquez
(74) *Attorney, Agent, or Firm* — Dentons US LLP

(57) ABSTRACT

The present invention relates to a protective film, a conductive laminate including the protective film, and a polarizing plate including the protective film, and provides the protective film which has peel strength controlled to be low, thus allowing for an easy removal of the protective film, which has an excellent polymerization stability and pot life, and may prevent a problem of an additive transfer to an adherend due to the additive.

17 Claims, No Drawings

(56) References Cited

FOREIGN PATENT DOCUMENTS

| TW | 201341491 A | | 10/2013 | |
|---|---|---|---|---|
| WO | WO 2011/122548 | * | 10/2011 | ............... C08K 5/09 |
| WO | WO 2012/036209 | * | 3/2012 | ........... H01L 21/683 |

* cited by examiner

PROTECTIVE FILM

This application is a National Stage Application of International Application No. PCT/KR2014/011256, filed Nov. 21, 2014, and claims the benefit of Korean Application No. 10-2013-0142080, filed Nov. 21, 2013, all of which are hereby incorporated by reference in their entirety for all purposes as if fully set forth herein.

BACKGROUND

1. Field of the Invention

The present invention relates to a protective film, a conductive laminate including the protective film, and a polarizing plate including the protective film.

2. Discussion of Related Art

The present invention relates to a protective film. The protective film may be applied to a conductive laminate or a polarizing plate.

Transparent electrodes are used in a variety of fields such as electrodes of various display devices, photoelectric converters such as a solar cell or the like, touch panels, and the like, and produced by forming a transparent conductive thin layer on a transparent substrate such as glass, a transparent film, etc. The conductive thin layer requires that a protective film prevents damage such as a contamination, a scratch, or the like to the thin layer in the process.

Further, the polarizing plate also requires that the protective film protects the polarizing plate from an external impact or friction, and contamination during a process of manufacturing from the polarizing plate to an LCD module.

The above-described protective film is required to have a pressure-sensitive adhesive property to the degree that the protective film is fixed to an adherend at the beginning, and low peel strength allowing the protective film to be peeled off from the adherend without damaging the adherend after a process is completed. Further, polymerization stability and a sufficient pot life are required for a pressure-sensitive adhesive included in the protective film. There is a method of forming a large amount of crosslinking to realize low peel strength, but the above-described method may cause a problem of a decrease in polymerization stability or the pot life, or the like. Further, when an additive is introduced to the protective film, peeling is easy, but the problem of the transfer of the additive to the adherend may be generated, thus causing degradation of optical physical properties, or the like.

Patent Document 1 which is a preceding patent proposes a protective film for preventing damage such as a contamination, a scratch, or the like to the conductive thin layer.

PATENT DOCUMENT (Patent Document 1) Japanese Patent Application No. 4342775

SUMMARY OF THE INVENTION

The present invention is directed to a protective film, a conductive laminate including the protective film, and a polarizing plate including the protective film, and provides the protective film which has peel strength controlled to be low, thus facilitating a removal of the protective film, and which has an excellent polymerization stability and pot life, and may prevent a problem of a transfer of an additive to an adherend due to the additive.

According to an aspect of the present invention, there is provided a protective film. The protective film may be applied to a conductive laminate, and be used to prevent damage such as a contamination, a scratch, or the like to a conductive layer in a manufacturing process of a conductive laminate. Further, the protective film of an embodiment of the present invention may be applied to a polarizing plate, and prevent the polarizing plate from an external impact or friction and contamination during a process of manufacturing from the polarizing plate to an LCD module.

An exemplary protective film includes a pressure-sensitive adhesive layer containing a pressure-sensitive adhesive base resin. The pressure-sensitive adhesive base resin may include polyorganosiloxane as a polymerization unit. That is, the polyorganosiloxane may be introduced into the resin as a polymerization unit.

In an embodiment of the present invention, the polymerization unit of polyorganosiloxane may be derived from a compound of the following Formula 1. Being "derived from" used in the present specification, for example, may denote that polyorganosiloxane may be formed from a specific compound capable of being a unit of a polymer before the polymerization unit of polyorganosiloxane forms a polymer.

[Formula 1]

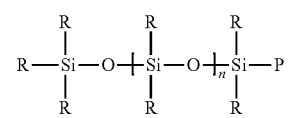

In Formula 1, n may be an integer in the range of 0 to 1,500. In the embodiment of the present invention, n may be in the range of 5 to 1,300, 10 to 1,000, 15 to 800, 20 to 500, 25 to 400, 30 to 300, 35 to 200, or 40 to 180. When a chain length of the polyorganosiloxane is controlled, the polyorganosiloxane may be properly included in the pressure-sensitive adhesive base resin as a polymerization unit, and thus low peel strength and polymerization stability suitable for the protective film may be obtained. Further, R may represent identical or different components, and may represent hydrogen, an alkyl group, an alkoxy group, an alkenyl group, or an alkynyl group, respectively. In the above description, for example, R may be an alkyl group having 1 to 30 carbon atoms, and more specifically, a methyl group, an ethyl group, or a propyl group.

The term "alkyl group" used in the present specification, unless otherwise defined, may refer to a straight-chain or branched-chain alkyl group having 1 to 20 carbon atoms, 1 to 16 carbon atoms, 1 to 12 carbon atoms, 1 to 8 carbon atoms, or 1 to 4 carbon atoms, or a cycloalkyl group having 3 to 20 carbon atoms, 3 to 16 carbon atoms, or 4 to 12 carbon atoms. The alkyl group may be arbitrarily substituted with one or more substituents.

The term "alkoxy group" used in the present specification, unless otherwise defined, may refer to an alkoxy group having 1 to 8 carbon atoms, or 1 to 4 carbon atoms. The alkoxy group may have a straight-chain, branched-chain, or ring shape. Further, the alkoxy group may be arbitrarily substituted with one or more substituents.

Further, an "alkenyl group" used in the present specification, unless otherwise defined, may refer to an alkenyl group having 2 to 20 carbon atoms, 2 to 16 carbon atoms, 2 to 12 carbon atoms, 2 to 8 carbon atoms, or 2 to 4 carbon atoms. The alkenyl group may have a straight-chain, branched-chain, or ring shape. Further, the alkenyl group may be arbitrarily substituted with one or more substituents.

Further, an "alkynyl group" used in the present specification, unless otherwise defined, may refer to an alkynyl group having 2 to 20 carbon atoms, 2 to 16 carbon atoms, 2 to 12 carbon atoms, 2 to 8 carbon atoms, or 2 to 4 carbon atoms.

Further, P of Formula 1 may be a polymerizable functional group. That is, the polyorganosiloxane may be introduced into the resin through the polymerizable functional group. Further, any functional group capable of being polymerized may be used as the polymerizable functional group without particular limitation, and for example, the polymerizable functional group may be an alkenyl group, an epoxy group, a cyano group, a carboxyl group, an acryloyl group, a methacryloyl group, an acryloyloxy group, or a methacryloyloxy group.

Further, in an embodiment of the present invention, the polymerizable functional group may be bound to only one end of a polyorganosiloxane chain. That is, polyorganosiloxane in which the polymerizable functional groups are formed at both ends may be excluded from the compound of Formula 1. In the above description, when polymerizable double bonds are present at both ends, crosslinking is performed during polymerization, and thus a precipitate which is insoluble in a solvent may be formed, or a resin may be hard to collect from a reactor. That is, crosslinking may be formed under conditions of aging after coating, and may not be formed in a process of preparing a resin.

A method of synthesizing the polyorganosiloxane is not particularly limited, and for example, may include a method of reacting a vinyl compound having a functional group which is crosslinkable with the pressure-sensitive adhesive base resin with a silicone resin having a SiH group through hydrosilylation, and thereby introducing a polymerizable functional group into the silicone resin, a method of a condensation reaction of a siloxane compound and a siloxane compound having a polymerizable functional group, etc.

In the embodiment of the present invention, the polyorganosiloxane may have a functional group equivalent, for example, of 3,000 to 20,000 g/mol, 3,500 to 18,000 g/mol, 4,000 to 16,000 g/mol, or 4,500 to 14,000 g/mol as one end as described above. When the functional group equivalent is less than 3,000 g/mol, the polyorganosiloxane is not sufficiently introduced into the pressure-sensitive adhesive base resin upon polymerization of the pressure-sensitive adhesive base resin to be obtained, and an adherend may be contaminated or peel properties may not be fully exhibited. Further, when the functional group equivalent is more than 20,000 g/mol, a sufficient adhesive force may not be obtained, and crosslinking may be performed during polymerization, and thus the precipitate which is insoluble in the solvent may be formed, or the resin may be hard to collect from the reactor.

Further, a weight-average molecular weight of the polyorganosiloxane is not particularly limited, and may be preferably in the range of 300 to 100,000. When the molecular weight is 300 or less, heat resistance of the pressure-sensitive adhesive base resin to be obtained may be insufficient, and when the molecular weight is 100,000 or more, the polyorganosiloxane may be difficult to be mixed with the pressure-sensitive adhesive base resin. In the embodiment of the present invention, the molecular weight, for example, may be in the range of 400 to 50,000, 400 to 30,000, or 500 to 20,000. Further, the polyorganosiloxane may have a viscosity of 30 to 500 $mm^2/s$ (square millimeter/second), 40 to 400 $mm^2/s$, 50 to 300 $mm^2/s$, or 200 to 550 $mm^2/s$ at 25° C. The molecular weight or viscosity may differ depending on the chain length of the polyorganosiloxane, and when the chain length of the polyorganosiloxane is controlled to be within the above range, the polyorganosiloxane may be properly included in the pressure-sensitive adhesive base resin as a polymerization unit, and thus low peel strength and polymerization stability suitable for the protective film may be obtained.

As described above, the protective film is additionally included in a conductive film to prevent contamination, a scratch, or the like to the thin layer in the manufacturing process of the conductive film, and the above-described protective film is required for low peel strength such that the protective film may be peeled without damaging the conductive thin layer after the process is over. Conventionally, a silicone or fluorine-based additive has been used for releasing to realize the above-described low peel strength. However, when the silicone or fluorine-based additive is used, a transfer of the additive to a base occurs upon peeling, peeling may not be clearly performed, and thus optical physical properties of the conductive film significantly degrade. The pressure-sensitive adhesive layer including the pressure-sensitive adhesive base resin to which the polyorganosiloxane chain is introduced is used in the protective film according to an embodiment of the present invention as described above, and thus the film may be easily released. Further, since a silicone compound is included in the pressure-sensitive adhesive base resin as a polymerization unit, and the silicone compound is not used as the additive, the problem of degraded optical physical properties of the adherend due to the additive transfer may be prevented.

In the above description, polyorganosiloxane is not particularly limited as long as the polyorganosiloxane may be introduced into the pressure-sensitive adhesive base resin. As described above, the polyorganosiloxane may be satisfied by the polyorganosiloxane derived from the compound of Formula 1. The above polyorganosiloxane is commercially available and may include, for example, X-24-8201, X-22-174DX, X-22-2426, X-22-2404, X-22-164A, X-22-164C (manufactured by Shin-Etsu Chemical Co., Ltd)., BY16-152D, BY16-152, BY16-152C (Dow Corning Toray Co., Ltd.), and FM-0711, FM-0721, FM-0725 (Chisso Corporation), etc.

In the embodiment of the present invention, the pressure-sensitive adhesive base resin may include a (meth)acrylic acid ester monomer as a polymerization unit. The pressure-sensitive adhesive base resin of an embodiment of the present invention may include 80 to 99.8 parts by weight, 82 to 99.5 parts by weight, 84 to 99 parts by weight, 86 to 97 parts by weight, or 87 to 95 parts by weight of the (meth)acrylic acid ester monomer, and 0.1 to 10 parts by weight, 0.1 to 8 parts by weight, 0.1 to 7 parts by weight, 0.1 to 6 parts by weight, 0.1 to 5 parts by weight, 0.1 to 3 parts by weight, or 0.1 to 1.5 parts by weight of the polyorganosiloxane as a polymerization unit. The unit "parts by weight" used in the present application may denote a weight ratio. When the weight ratio between the monomers is adjusted as described above, physical properties such as an initial adhesive force, durability, peel strength, or the like of the pressure-sensitive adhesive layer may be effectively maintained.

In the embodiment of the present invention, the (meth) acrylic acid ester monomer may be an alkyl(meth)acrylate. For example, the (meth)acrylic acid ester monomer may be one or more selected from the group consisting of methyl (meth)acrylate, ethyl(meth)acrylate, n-propyl(meth)acrylate, isopropyl(meth)acrylate, n-butyl(meth)acrylate, t-butyl (meth)acrylate, sec-butyl(meth)acrylate, pentyl(meth)

acrylate, 2-ethylhexyl(meth)acrylate, 2-ethylbutyl(meth) acrylate, n-octyl(meth)acrylate, isooctyl(meth)acrylate, isononyl(meth)acrylate, lauryl(meth)acrylate, and tetradecyl (meth)acrylate, but is not limited thereto.

Further, the pressure-sensitive adhesive base resin of an embodiment of the present invention may further include a polymerization unit derived from a copolymerizable monomer having a crosslinkable functional group. In the embodiment of the present invention, the copolymerizable monomer having a crosslinkable functional group may be one or more selected from the group consisting of a hydroxy group-containing comonomer, a carboxyl group-containing comonomer, and a nitrogen containing-comonomer. In the above description, the copolymerizable monomer having a crosslinkable functional group may be included at 0.01 to 14 parts by weight, 0.5 to 14 parts by weight, 1 to 13 parts by weight, 2 to 12 parts by weight, 3 to 11 parts by weight, 3 to 9 parts by weight, or 3 to 8 parts by weight with respect to 100 parts by weight of the pressure-sensitive adhesive base resin. When the copolymerizable monomer having a crosslinkable functional group is adjusted to be within the above range, storage stability of the base resin may be ensured. More specifically, a method of forming a large amount of crosslinking is used to realize low peel strength suitable for the protective film, and a crosslinkable functional group-containing monomer may be used for the above method. However, when the crosslinkable functional group-containing monomer is included at 14 parts by weight or more in the resin to realize low peel strength, storage stability and polymerization stability of the base resin may be degraded.

In the embodiment of the present invention, the pressure-sensitive adhesive layer may further include a multifunctional crosslinking agent capable of crosslinking the pressure-sensitive adhesive base resin. Examples of the multifunctional crosslinking agent may include an isocyanate-based compound, an epoxy-based compound, an aziridine-based compound, a metal chelate based compound, or the like, and one type or two or more types thereof may be properly selected in consideration of a type of the crosslinkable functional group included in the resin. Examples of the isocyanate compound may include diisocyanate, xylene diisocyanate, diphenylmethane diisocyanate, hexamethylene diisocyanate, isophorone diisocyanate, tetramethylxylene diisocyanate, naphthalene diisocyanate, or the like, or an additive reactant of one or more isocyanate-based compounds in the above description and a polyol. Examples of the polyol may include trimethylolpropane or the like. Further, examples of the epoxy compound may include one type or two or more types of ethyleneglycol diglycidyl ether, triglycidyl ether, trimethylolpropane triglycidyl ether, N,N, N',N'-tetraglycidyl ethylenediamine, glycerine diglycidyl ether, or the like, and examples of the aziridine compound may include one type or two or more types of N,N'-toluene-2,4-bis(1-aziridinecarboxamide), N,N'-diphenylmethane-4, 4'-bis(1-aziridinecarboxamide), triethylenemelamine, bisisoprothaloyl-1-(2-methylaziridine), tri-1-aziridinylphosphineoxide, or the like. Further, examples of the metal chelate compound may include compounds prepared by coordinating a multivalent metal such as Al, Fe, Zn, Sn, Ti, Sb, Mg, or V with acetyl acetone or ethyl acetoacetate.

In the embodiment of the present invention, the multifunctional crosslinking agent may be a mixture of an aliphatic linear polyvalent NCO and an aliphatic ring-shaped polyvalent NCO. For example, the aliphatic linear polyvalent NCO may be hexamethylene diisocyanate, and the aliphatic ring-shaped polyvalent NCO may be isophorone diisocyanate. The aliphatic linear polyvalent NCO and aliphatic ring-shaped polyvalent NCO may be mixed in the ratio in the range of 6:4 to 9:1 to form the mixture, and NCO may be included at 8 to 20 wt % in the mixture. Further, the NCO may refer to an isocyanate group in the present specification.

The multifunctional crosslinking agent may be included at 0.01 to 20 parts by weight, 0.1 to 18 parts by weight, 0.5 to 15 parts by weight, 1.5 to 10 parts by weight, 2 to 8 parts by weight, 2.5 to 5 parts by weight, or 2.5 to 4 parts by weight with respect to 100 parts by weight of the pressure-sensitive adhesive base resin in the pressure-sensitive adhesive layer. In order to realize low peel strength suitable for the protective film, a method of forming a large amount of crosslinking is used, requiring the use of an excess of a crosslinking agent. However, when the excess of the crosslinking agent is used, a problem of an increased pot life of the coating solution of the pressure-sensitive adhesive layer may be generated. When content of the multifunctional crosslinking agent in the pressure-sensitive adhesive layer according to an embodiment of the present invention are limited to 20 parts by weight or less, 14 parts by weight or less, or 10 parts by weight or less, the pot life of the pressure-sensitive adhesive layer may be improved.

Further, the pressure-sensitive adhesive layer according to an embodiment of the present invention may further include a curing retarder. Examples of the curing retarder may include one or more of β-keto ester such as methyl acetoacetate, ethyl acetoacetate, octyl acetoacetate, oleyl acetoacetate, lauryl acetoacetate, stearyl aceto acetate, or the like, or β-diketone such as acetyl acetone, 2,4-hexanedione, benzoyl acetone, or the like.

The pressure-sensitive adhesive layer according to an embodiment of the present invention may further include one type or two or more types of additives such as a silane coupling agent, a tackifier, an epoxy resin, a UV light stabilizer, a coloring agent, a reinforcing agent, a filler, an antifoaming agent, a surfactant, a catalyst, or a plasticizer in addition to the above-described components.

In the embodiment of the present invention, the protective film may further include a basebase layer, and the pressure-sensitive adhesive layer may be formed on one side of the basebase layer. The basebase layer may include a polyester-based polymer, a polyolefin-based polymer, a norbornene-based polymer, a one-component polymer such as polycarbonate, polyether sulfone, polyarylate, or the like, a copolymerized polymer, or an epoxy-based polymer. A thickness of the basebase layer is not particularly limited, but generally is in the range of about 20 to 300 μm, and preferably in the range of 30 to 200 μm.

In the embodiment of the present invention, the pressure-sensitive adhesive base resin forming the pressure-sensitive adhesive layer of an embodiment of the present invention may be cured by being mixed with the above-described multifunctional crosslinking agent. Further, the pressure-sensitive adhesive base resin requires 5 hours or more until a viscosity of the resin is increased to twice or more the initial viscosity of the resin upon completion of preparation, right after the resin is mixed with a crosslinking agent. More specifically, the above-described time may be in the range of 5 to 100 hours, 10 to 100 hours, 15 to 100 hours, or 20 to 100 hours. When the viscosity of the pressure-sensitive adhesive layer increases to twice or more the initial viscosity, a further coating process is impossible, and thus the time required may be defined as a pot life in the present specification. The protective film of an embodiment of the present invention may sufficiently ensure the pot life as described above, and thus the manufacturing process may be effectively performed.

According to another aspect of the present invention, there is provided a conductive laminate. An exemplary conductive laminate may further include the above-described protective film. In the embodiment of the present invention, the conductive laminate may further include a conductive film having at least one conductive layer, and the protective film adhered to one side of the conductive film.

The conductive film of an embodiment of the present invention is not particularly limited as long as it includes at least one layer of the conductive layer. Examples of materials forming the conductive layer may include a metal such as gold, silver, platinum, palladium, copper, aluminum, nickel, chromium, titanium, iron, cobalt, tin and an alloy of two or more thereof; a metal oxide including indium oxide, tin oxide, titanium oxide, cadmium oxide, or a mixture of two types or more thereof; and another metal oxide including copper iodide or the like. The conductive layer may be a crystal layer, or an amorphous layer. In the embodiment of the present invention, the conductive layer may be preferably formed using indium tin oxide (ITO), but is not limited thereto. Further, a thickness of the conductive layer as described above may be adjusted to about 10 to 300 nm, and preferably, about 10 to 200 nm in consideration of a probability of a continuous film formation, conductivity, transparency, or the like.

In the embodiment of the present invention, the conductive layer may be formed on a plastic basefilm through an anchor layer or a dielectric layer. The anchor layer or dielectric layer may function to enhance adhesion between the conductive layer and the base film, and improve scratch resistance or flexural resistance. The anchor layer or dielectric layer as described above may be formed through a vacuum deposition method, a sputtering method, an ion plating method, or a coating method using an inorganic substance such as $SiO_2$, $MgF_2$, $Al_2O_3$, or the like; an organic substance such as an acryl resin, an urethane resin, a melamine resin, an alkyd resin, a siloxane-based polymer, or the like; or a mixture of two types or more thereof. The anchor layer or dielectric layer may be formed to have a thickness of about 100 nm or less, specifically, 15 to 100 nm, and more specifically, 20 to 60 nm.

In the embodiment of the present invention, a proper adhesive treatment such as a corona discharge treatment, an ultraviolet irradiation treatment, a plasma treatment, a sputter etching treatment, or the like may be performed on the base or substrate on which the conductive layer is formed.

The conductive film may further include a transparent base unveiling the conductive layer. As the transparent base, particularly, the transparent base having excellent transparency or heat resistance is preferably used. Examples of an organic polymer as described above may include a one-component polymer such as a polyester-based polymer such as polyethylene terephthalate, a polyolefin-based polymer, a norbornene-based polymer, a polycarbonate, a polyether sulfone or a polyarylate, a copolymerized polymer, or an epoxy-based polymer, etc. Examples of the transparent base may preferably include a film phase product, a sheet phase product, and another molded product of the above-described organic polymers.

In the embodiment of the present invention, a structure of the conductive film is not particularly limited, and may include a hard coating layer, the transparent basebase layer, and the conductive layer. Further, the pressure-sensitive adhesive layer on the protective film may be positioned on the hard coating layer of the conductive film.

According to another aspect of the present invention, there is provided a polarizing plate. An exemplary polarizing plate may include the above-described protective film. In the embodiment of the present invention, the polarizing plate may include at least one polarizer, and the protective film adhered to one side of the polarizer. The polarizing plate having the protective film may be applied to all general liquid crystal display devices, and types of the liquid crystal panel are not particularly limited. For example, the liquid crystal display device including the liquid crystal panel in which the protective film is bonded to either or both sides of a liquid crystal cell may be formed.

EFFECTS

The protective film according to the embodiment of the present invention has peel strength controlled to be low, and thus a removal of the protective film is easy, and the protective film has an excellent polymerization stability and pot life, and may prevent a problem of the transfer of the additive to the adherend due to the additive.

DETAILED DESCRIPTION OF EXEMPLARY EMBODIMENTS

Hereinafter, the present invention will be described in detail in conjunction with examples according to an embodiment of the present invention and comparative examples not according to an embodiment of the present invention, but is not limited to the following examples.

Example 1

Preparation of Pressure-sensitive Adhesive Layer

In ethyl acetate, 2-ethylhexyl acrylate (2-EHA), X-22-2426 (Shin-Etsu Chemical Co., Ltd.) as reactive polyorganosiloxane, and 2-hydroxyethyl acrylate (2-HEA) were copolymerized in the weight ratio of 89:1:10 (2-EHA:X-22-2426:2-HEA), and thereby an acryl-based copolymer solution was obtained.

Then, 7.5 parts by weight of HMDI/IPDI (=8/2 weight ratio (NCO %:16 wt %)) which is an isocyanate-based crosslinking agent, 7 parts by weight of acetyl acetone as a curing retarder, and 0.01 parts by weight of dibutyltin dilaurate as a catalyst with respect to 100 parts by weight of the acryl-based copolymer (solid fraction) were mixed, and thereby a pressure-sensitive adhesive composition was obtained.

Preparation of Protective Film

The pressure-sensitive adhesive composition was coated on one side of A4300 PET (Toyobo Co., Ltd.) (thickness: 100 μm), dried, and thereby a transparent pressure-sensitive adhesive layer which has a thickness of 20 μm was formed. The transparent pressure-sensitive adhesive layer which was coated on one side of A4300 PET was aged at 40° C. for 4 days immediately after drying and covering a release film.

Preparation of Conductive Laminate

The prepared protective film was adhered to one side of L2CC5 (LG Chem, Ltd.) as an ITO film. The protective film was laminated such that a pressure-sensitive adhesive layer of the protective film contacts a hard coating layer of the ITO film.

Example 2

The protect film and conductive laminate were prepared in a same manner as in Example 1 except that X-22-174DX (Shin-Etsu Chemical Co., Ltd.) was used as polyorganosiloxane instead of X-22-2426 (Shin-Etsu Chemical Co., Ltd.).

Example 3

The protect film and conductive laminate were prepared in a same manner as in Example 1 except that 2-ethylhexyl acrylate, X-22-2426 (Shin-Etsu Chemical Co., Ltd.) as polyorganosiloxane, and 2-hydroxyethyl acrylate were used in the weight ratio of 94:1:5 (2-EHA:X-22-2426:2-HEA) to prepare a copolymer, and 3.8 parts by weight of HMDI/IPDI (=8/2 weight ratio (NCO %:16 wt %)) which is an isocyanate-based crosslinking agent was used with respect to 100 parts by weight of the copolymer.

Example 4

The protect film and conductive laminate were prepared in a same manner as in Example 1 except that 2-ethylhexyl acrylate, X-22-2426 (Shin-Etsu Chemical Co., Ltd.) as polyorganosiloxane, and 2-hydroxyethyl acrylate were used in the ratio of 94.5:0.5:5 (2-EHA:X-22-2426:2-HEA) to prepare the copolymer, and 3.8 parts by weight of HMDI/IPDI (=8/2 weight ratio (NCO %:16 wt %)) which is the isocyanate-based crosslinking agent was used with respect to 100 parts by weight of the copolymer.

COMPARATIVE EXAMPLE 1

The protective film and conductive laminate were prepared in a same manner as in Example 1 except that 2-ethylhexyl acrylate and 2-hydroxyethyl acrylate was used in the ratio of 85:15 (2-EHA:2-HEA) to prepare the copolymer without adding polyorganosiloxane, and 11.7 parts by weight of HMDI/IPDI (=8/2 weight ratio (NCO %:16 wt %)) which is the isocyanate-based crosslinking agent was used with respect to 100 parts by weight of the copolymer.

COMPARATIVE EXAMPLE 2

The protective film and conductive laminate were prepared in a same manner as in Example 1 except that 2-ethylhexyl acrylate and 2-hydroxyethyl acrylate was used in the ratio of 95:5 (2-EHA:2-HEA) to prepare the copolymer without adding polyorganosiloxane, and 3.8 parts by weight of HMDI/IPDI (=8/2 weight ratio (NCO %:16 wt %)) which is the isocyanate-based crosslinking agent was used with respect to 100 parts by weight of the copolymer.

COMPARATIVE EXAMPLE 3

The protective film and conductive laminate were prepared in a same manner as in Example 1 except that 2-ethylhexyl acrylate and 2-hydroxyethyl acrylate as a resin were used in the ratio of 90:10 (2-EHA:2-HEA) to prepare the copolymer, 0.1 parts by weight of BYK-377 not having a polymerizable functional group was added with respect to 100 parts by weight of the copolymer as polyorganosiloxane, and 7.5 parts by weight of HMDI/IPDI (=8/2 weight ratio (NCO %:16 wt %)) which is the isocyanate-based crosslinking agent was used with respect to 100 parts by weight of the copolymer.

EXPERIMENTAL EXAMPLE 1

Peel Strength

The pressure-sensitive adhesive layers of the protective films which are aged (cured) in the examples and comparative examples were adhered to the hard coating layer of the ITO film, a heat treatment was performed thereon at 150° C. for 1 hour, and then a peel strength (width: 1 inch) was measured using a high speed peel tester (CBT-4720; manufactured by Chung-buk Tech) at a peeling angle of 180° and a peeling speed of 20 m/min under conditions of room temperature.

EXPERIMENTAL EXAMPLE 2

Pot Life

A viscosity of the pressure-sensitive adhesive composition prepared in the examples and comparative examples was measured under conditions of a spindle #63, a temperature of 25° C., and at a rate of 50 rpm using a rotation viscometer (LVDV-II pro; manufactured by Brookfield Engineering Laboratories, Inc.). The viscosity of the composition in which the copolymer and the crosslinking agent were just mixed was assumed as an initial viscosity, and a change of the time required until the viscosity increased twice or more than the initial viscosity was measured, and defined as a pot life.

EXPERIMENTAL EXAMPLE 3

Haze

The protective film was peeled off from the conductive laminate prepared in the examples and comparative examples, and then haze of the conductive laminate was measured using a hazemeter (HM-150).

TABLE 1

|  | Pot life (hr) | Peel strength (gf/in) | Haze (%) |
| --- | --- | --- | --- |
| Example 1 | 12 | 19 | 0.82 |
| Example 2 | 11 | 21 | 0.89 |
| Example 3 | 75 | 86 | 0.84 |
| Example 4 | 74 | 91 | 0.81 |
| Comparative Example 1 | 2 | 25 | 0.89 |
| Comparative Example 2 | 74 | 154 | 0.88 |
| Comparative Example 3 | 10 | 25 | 2.1 |

In Comparative Examples 1 and 2, a polyorganosiloxane chain was not introduced into the pressure-sensitive adhesive layer, and thus an insufficient pot life was obtained or high peel strength was measured. In Comparative Example 3, as a result of including polyorganosiloxane as an additive, it was determined that the additive was transferred to the ITO after peeling off the protective film, thereby decreasing optical physical properties.

What is claimed is:

1. A protective film, comprising a pressure-sensitive adhesive layer which contains:
   a pressure-sensitive adhesive base resin having polyorganosiloxane as a polymerization unit, wherein the polymerization unit of polyorganosiloxane is derived from a compound of Formula 1:

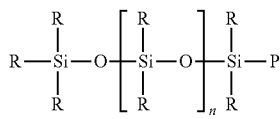

wherein:
n is an integer in the range of 0 to 1,500;
R represents identical or different components, and represents hydrogen, an alkyl group, an alkoxy group, or an alkynyl group, respectively, and P is a polymerizable functional group; and
the polyorganosiloxane has a functional group equivalent of 3,000 to 20,000 g/mol;
a multifunctional crosslinking agent which crosslinks the pressure-sensitive adhesive base resin, wherein the multifunctional crosslinking agent is a mixture of an aliphatic linear polyvalent NCO and an aliphatic ring-shaped polyvalent NCO, the aliphatic linear polyvalent NCO and aliphatic ring-shaped polyvalent NCO present in a ratio in the range of 6:4 to 9:1 to form the mixture; and
a curing retarder.

2. The protective film of claim 1, wherein the polyorganosiloxane has a weight-average molecular weight of 300 to 100,000.

3. The protective film of claim 1, wherein the polymerizable functional group comprises an alkenyl group, an epoxy group, a cyano group, a carboxyl group, an acryloyl group, a methacryloyl group, an acryloyloxy group, or a methacryloyloxy group.

4. The protective film of claim 1, wherein the pressure-sensitive adhesive base resin further comprises a (meth) acrylic acid ester monomer as a polymerization unit.

5. The protective film of claim 4, wherein the pressure-sensitive adhesive base resin comprises polymerization units derived from 80 to 99.8 parts by weight of the (meth)acrylic acid ester monomer and 0.1 to 10 parts by weight of polyorganosiloxane.

6. The protective film of claim 4, wherein the pressure-sensitive adhesive base resin further comprises a polymerization unit derived from a copolymerizable monomer having a crosslinkable functional group.

7. The protective film of claim 6, wherein the copolymerizable monomer having a crosslinkable functional group is one or more selected from the group consisting of a hydroxy group-containing comonomer, a carboxyl group-containing comonomer, and a nitrogen containing-comonomer.

8. The protective film of claim 6, wherein the copolymerizable monomer having a crosslinkable functional group is included at 0.01 to 14 parts by weight with respect to 100 parts by weight of the pressure-sensitive adhesive base resin.

9. The protective film of claim 1, wherein the multifunctional crosslinking agent is included at 0.01 to 20 parts by weight with respect to 100 parts by weight of the pressure-sensitive adhesive base resin in the pressure-sensitive adhesive layer.

10. The protective film of claim 1, wherein the curing retarder is one or more selected from the group consisting of methyl acetoacetate, ethyl acetoacetate, octyl acetoacetate, oleyl acetoacetate, lauryl acetoacetate, stearyl acetoacetate, acetyl acetone, 2,4-hexanedione, or benzoyl acetone.

11. The protective film of claim 1, further comprising a base layer, wherein the pressure-sensitive adhesive layer is formed on one side of the base layer.

12. The protective film of claim 11, wherein the base layer comprises a one-component polymer such as a polycarbonate, a polyether sulfone, a polyacrylate, a polyester-based polymer, a polyolefin-based polymer or a norbornene-based polymer, a copolymerized polymer, or an epoxy-based polymer.

13. The protective film of claim 1, wherein the pressure-sensitive adhesive base resin is a resin which requires 5 hours or more until a viscosity of the resin is increased to twice or more than the initial viscosity of the resin which has just been prepared, immediately after the resin is mixed with a crosslinking agent.

14. The protective film of claim 1, wherein the polymerizable functional group comprises an alkenyl group, an epoxy group, a cyano group, or a carboxyl group.

15. The protective film of claim 1, wherein the curing retarder comprises a β-keto ester selected from the group consisting of methyl acetoacetate, ethyl acetoacetate, octyl acetoacetate, oleyl acetoacetate, lauryl acetoacetate, and stearyl acetoacetate.

16. A conductive laminate comprising:
a conductive film having at least one conductive layer; and
the protective film of claim 1 adhered to one side of the conductive film.

17. A polarizing plate comprising:
at least one polarizer; and
the protective film of claim 1 adhered to one side of the polarizer.

* * * * *